US011582238B2

(12) United States Patent
Sanaullah et al.

(10) Patent No.: US 11,582,238 B2
(45) Date of Patent: Feb. 14, 2023

(54) SECURING A SERVER FROM UNTRUSTED CLIENT APPLICATIONS

(71) Applicant: Dell Products L.P., Round Rock, TX (US)

(72) Inventors: Abu Shaher Sanaullah, Austin, TX (US); Mohit Arora, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 16/539,252

(22) Filed: Aug. 13, 2019

(65) Prior Publication Data
US 2021/0051150 A1    Feb. 18, 2021

(51) Int. Cl.
H04L 9/40    (2022.01)
(52) U.S. Cl.
CPC ................... H04L 63/101 (2013.01)
(58) Field of Classification Search
CPC ..................................... H04L 63/101
USPC ............................................. 726/4
See application file for complete search history.

(56) References Cited

U.S. PATENT DOCUMENTS

| | | | |
|---|---|---|---|
| 6,282,701 B1 * | 8/2001 | Wygodny | G06F 11/3466 702/183 |
| 9,773,102 B2 * | 9/2017 | Graham | G06F 21/335 |
| 2009/0165132 A1 * | 6/2009 | Jain | G06F 21/51 726/22 |
| 2009/0187763 A1 * | 7/2009 | Freericks | H04L 67/34 713/167 |
| 2009/0254753 A1 * | 10/2009 | De Atley | G06F 21/51 713/176 |
| 2013/0298128 A1 * | 11/2013 | Russinovich | G06F 9/468 718/100 |
| 2014/0250526 A1 * | 9/2014 | Khanna | H04L 63/1483 726/22 |
| 2015/0178495 A1 * | 6/2015 | Sheehan | G06F 21/44 726/16 |
| 2015/0332047 A1 * | 11/2015 | Rothwell | G06F 21/566 726/23 |
| 2017/0223024 A1 * | 8/2017 | Desai | H04L 63/0272 |
| 2018/0150288 A1 * | 5/2018 | Shantharam | G06F 9/45512 |

(Continued)

FOREIGN PATENT DOCUMENTS

CA    2649862 A1 * 12/2007    ......... G06F 21/6218

OTHER PUBLICATIONS

Troelsen, Andrew. "Processes, AppDomains, Contexts, and CLR Hosts." Pro VB 2005 and the .NET 2.0 Platform (2006): 441-462. (Year: 2006).*

(Continued)

Primary Examiner — Oscar A Louie
Assistant Examiner — Melaku Y Habtemariam
(74) Attorney, Agent, or Firm — Norton Rose Fulbright US LLP

(57) ABSTRACT

An information handling system may identify a process identifier of a client application that has requested a connection with the information handling system. The information handling system may obtain an access control list of a process associated with the process identifier. The information handling system may determine whether to establish a connection between the client application and the information handling system based, at least in part, on analysis of the access control list.

19 Claims, 4 Drawing Sheets

(56) References Cited

U.S. PATENT DOCUMENTS

2018/0285554 A1* 10/2018 Biswas ............... G06F 21/6281
2019/0369978 A1* 12/2019 Gandhi ................ G06F 9/3017

OTHER PUBLICATIONS

Al-Sakran, Aya, Mahmoud H. Qutqut, Fadi Almasalha, Hossam S. Hassanein, and Mohammad Hijjawi. "An overview of the Internet of things closed source operating systems." In 2018 14th International Wireless Communications & Mobile Computing Conference (IWCMC), pp. 291-297. IEEE, 2018. (Year: 2018).*

Magkos, Emmanouil, and Panayiotis Kotzanikolaou. "Achieving privacy and access control in pervasive computing environments." Security and Communication Networks Security Comm. Networks 00 (2010): 1-12.*

* cited by examiner

SECURING A SERVER FROM UNTRUSTED CLIENT APPLICATIONS

FIELD OF THE DISCLOSURE

The instant disclosure relates to system security. More specifically, portions of this disclosure relate to securing a server from untrusted client applications by using custom Universal Windows Platform security identifiers to deny server connections requested by untrusted client applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

System objects, e.g., files and named pipes, of an information handling system are typically accessed by client applications. Two common application programming interfaces (APIs) used to develop client applications for Microsoft Windows operating systems are the Windows API and the Universal Windows Platform (UWP) API. For example, Win32 applications are developed using the Windows API, and UWP applications are developed using the UWP API.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

One distinction between UWP and Win32 applications is the security associated with each type of application. For example, there are many cases in which only a particular UWP application (and no other application or user) should be granted access to a system object, such as a Remote Procedure Call (RPC) interface system object. However, in conventional systems, while an operating system can prevent another unauthorized UWP application from communicating over the RPC interface, the operating system cannot prevent another Win32 application from accessing the same RPC interface. This is because the client identifier (e.g., Client PID) used to identify an application to a RPC server cannot differentiate between UWP and Win32 applications. As an example, while the OS can prevent an unauthorized UWP app from communicating over an RPC interface, the OS cannot prevent a Win32 app from accessing the same interface. Security measures are not equally offered by legacy, less-secure Win32 applications in comparison to UWP applications. The result is a security threat whereby Win32 applications may access system objects they are not authorized to access, because the RPC server cannot distinguish between UWP and Win32 applications. Using embodiments of the invention described herein, the RPC server can use an ACL list to secure connections to UWP and Win32 applications. For example, a solution is to use UWP custom capability controls to limit Win32 applications' access.

An information handling system may use custom UWP security identifiers to enhance security and restrict Win32 applications from accessing systems objects that the Win32 applications are not authorized to access. As such, an information handling system may gain the ability to prevent system objects from being accessed by unauthorized Win32 applications to the same or similar extent that the information handling system can prevent system objects from being accessed by unauthorized UWP applications. As a result, the security threat posed by the less-secure Win32 applications may be reduced.

Although UWP and Win32 applications are used as examples herein, the distinction may more generically be between any application/service of a first type and any application/service of a second type, wherein an application/service type is defined by the application programming interface (API) used by the application/service and/or the security features (e.g., type of identifier) of that API. In the example of UWP and Win32 applications, the UWP application is an application of a first type that uses the UWP API and has an associated identifier and the Win32 application is an application of a second type that uses the Win32 API and has an associated identifier. The embodiments described herein allow securing RPC resources of a first type (e.g., a UWP RPC connections such as HSA-RPC) from applications of a second type (e.g., Win32 clients). In some embodiments, restrictions are added to applications of a first type (e.g., legacy Win32 apps) using custom capability derived identifiers of a second type (e.g., UWP World SID). For example, access can be denied to certain Win32 applications because they do not have a trusted UWP SID in their ACL.

According to one embodiment, a method may include identifying, by a processor of the information handling system, a process identifier of a client application that has requested a connection with the information handling system. The method may also include obtaining, by the processor, an access control list of a process associated with the process identifier. The method may further include determining, by the processor, whether to establish a connection between the client application and the information handling system based, at least in part, on analysis of the access control list.

According to another embodiment, an information handling system includes a processor configured to perform the step of identifying a process identifier of a client application that has requested a connection with the information handling system. The processor may also be configured to perform the step of obtaining an access control list of a process associated with the process identifier. The processor may be further configured to perform the step of determining whether to establish a connection between the client application and the information handling system based, at least in part, on analysis of the access control list.

According to yet another embodiment, a computer program product includes a non-transitory computer readable medium having instructions to perform step of identifying a process identifier of a client application that has requested a connection with the information handling system. The non-transitory computer readable medium may also have instructions to perform step of obtaining an access control list of a process associated with the process identifier. The non-transitory computer readable medium may further include instructions to perform step of determining whether to establish a connection between the client application and the information handling system based, at least in part, on analysis of the access control list.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
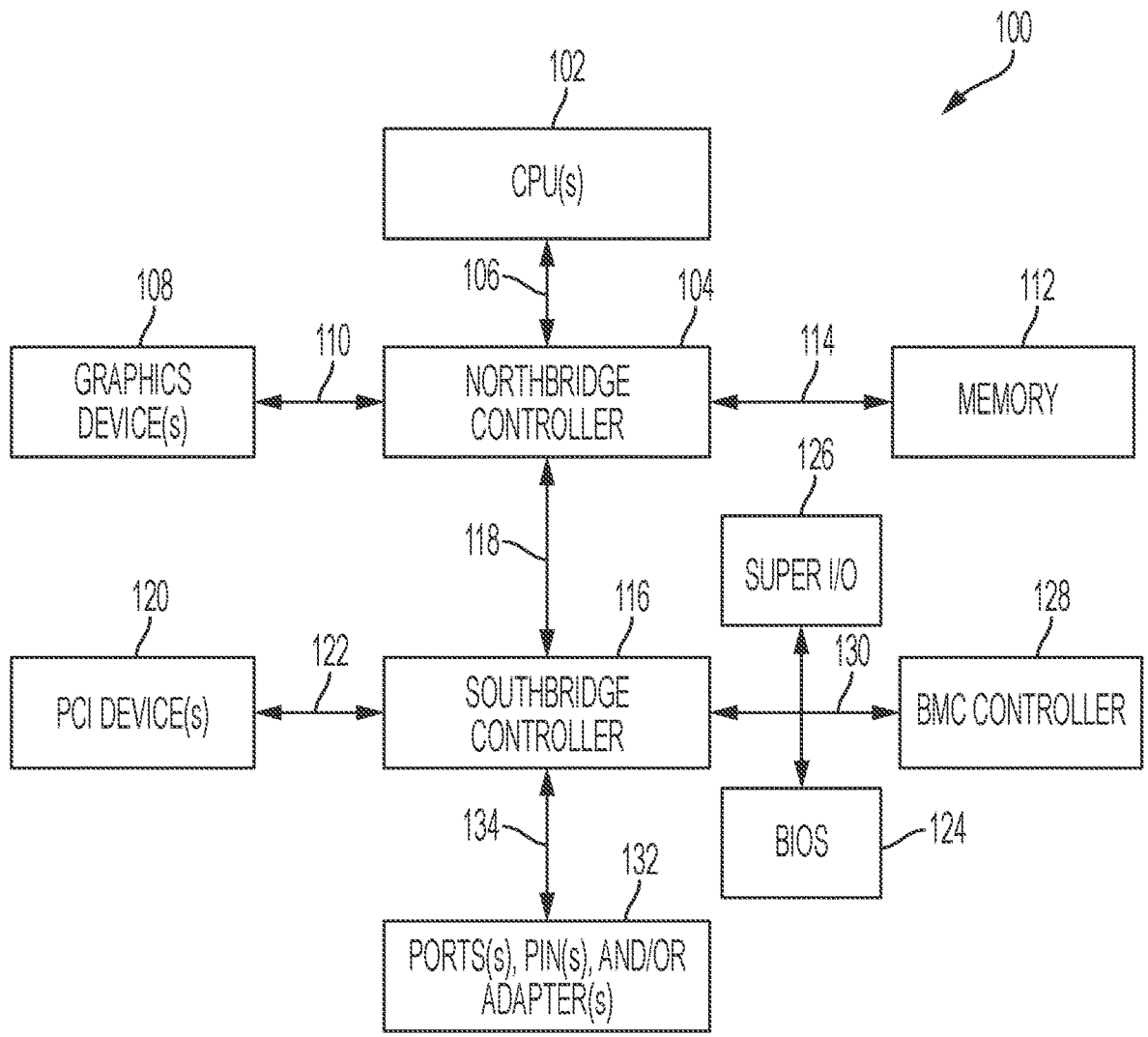
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC 128 may include non-volatile memory having program instructions stored thereon that are usable by CPU(s) 102 to enable remote management of IHS 100. For example, BMC 128 may enable a user to discover, configure, and manage BMC 128, setup configuration options, resolve and administer hardware or software problems, etc. Additionally or alternatively, BMC 128 may include one or more firmware volumes, each volume having one or more firmware files used by the BIOS' firmware interface to initialize and test components of IHS 100. BMC 128 may include an integrated Dell Remote Access Controller (iDRAC) and may communicate with a remote client, such as a server or other remote information handling system, to receive firmware updates for information handling system components, such as PCI components 220.

Super I/O controller 126 may combine interfaces for a variety of lower bandwidth or low data rate devices. Those devices may include, for example, floppy disks, parallel ports, keyboard and mouse, temperature sensor and fan speed monitoring, etc. For example, the super I/O controller 126 may be coupled to the one or more upstream sensors 106 and to the one or more downstream sensors 108.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
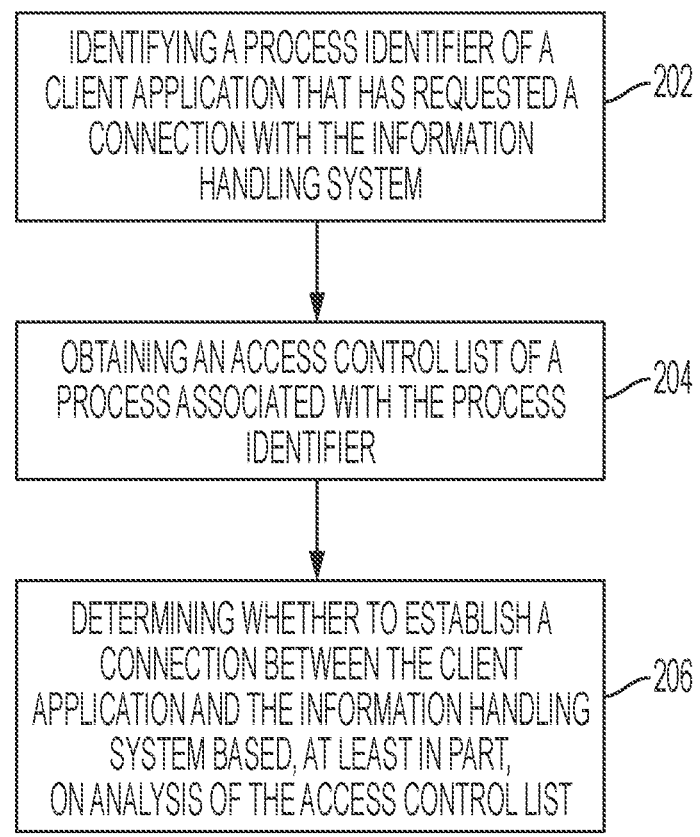
FIG. 2 is a process flow diagram of an example process for securing an information handling system from untrusted client applications according to some embodiments of the disclosure.

FIG. 2 is a process flow diagram of an example process for securing an information handling system from untrusted client applications. Aspects of method 200 may be implemented with the aspects of this disclosure described with respect to FIG. 1. Specifically, method 200 includes, at block 202, the step of identifying, by a processor of the information handling system, a process identifier of a client application that has requested a connection with the information handling system. At block 204, method 200 includes the step of obtaining, by the processor, an access control list of a process associated with the process identifier. Method 200 further includes, at block 206, the step of determining, by the processor, whether to establish a connection between the client application and the information handling system based, at least in part, on analysis of the access control list.

Figure 3A:
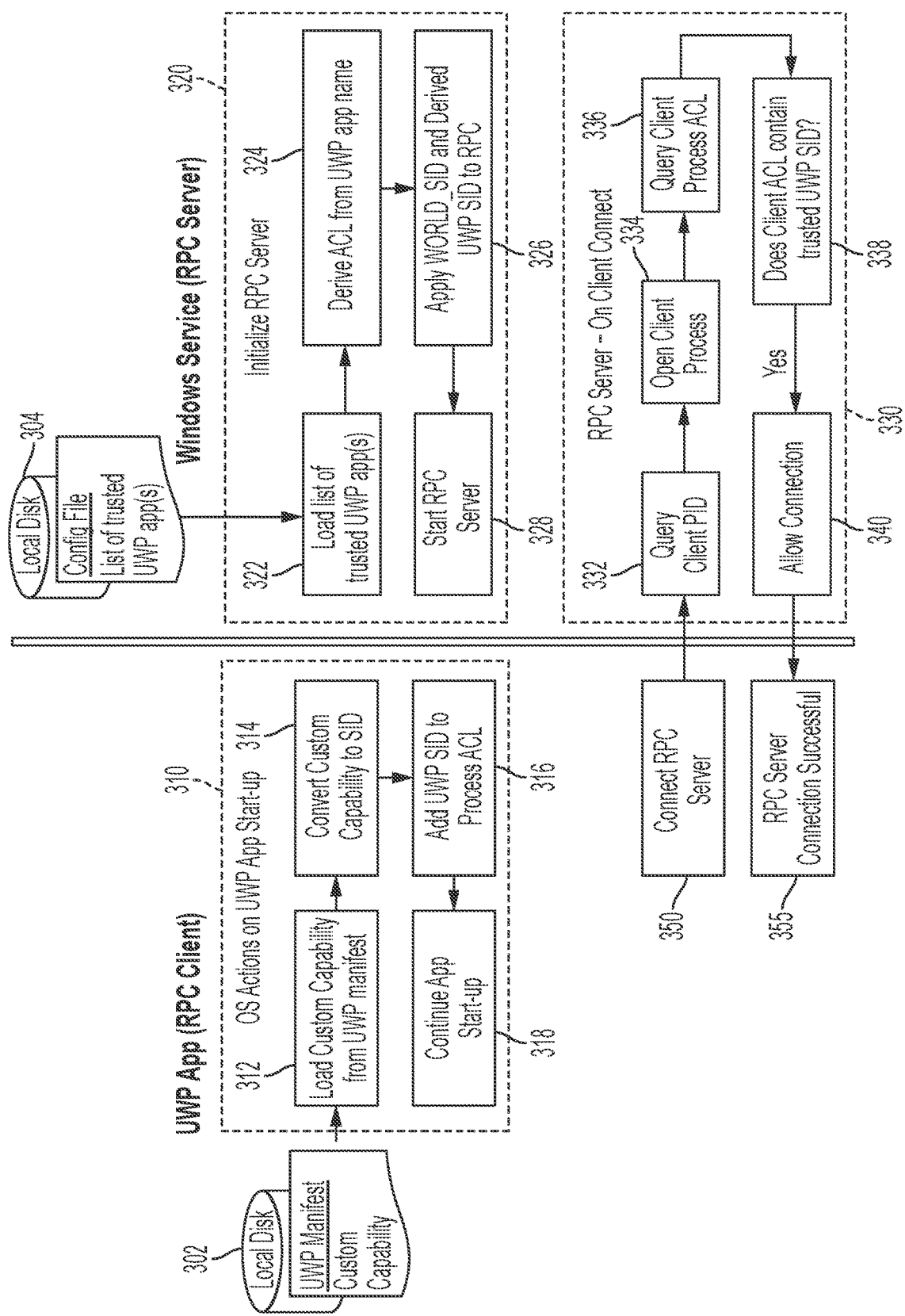
FIG. 3A is a block diagram illustrating an example process for securing an information handling system from untrusted client applications, such as the process illustrated at FIG. 2, whereby a trusted UWP application is granted access to a system object according to some embodiments of the disclosure.

As an example of method 200, FIG. 3A is a block diagram illustrating an example process for securing an information handling system from untrusted client applications, such as the process illustrated at FIG. 2, whereby a trusted UWP application is granted access to a system object. In particular, FIG. 3A illustrates client and server operations that may be performed by an information handling system. In various embodiments, an information handling system may perform only the client operations, only the server operations, both the client and server operations, or some of the client and/or server operations.

A client application may be a UWP client application or another client application based on the Windows API. For example, another client application may be a Win16, Win32, Win32s, Win64, or WinCE client application. In other implementations, the client application may be another Windows-API based client application.

At block 310, FIG. 3A illustrates client operations that may be performed by an information handling system when a UWP client application starts up. Specifically, at block 312, the information handling system, e.g., a processor of the information handling system, may load custom capabilities of the UWP application from the UWP application's package manifest. In some embodiments, the package manifest may be loaded from a local disk 302. At block 314, the information handling system may convert a custom capability of the UWP application to a security identifier (SID) for the UWP application. At block 316, the information handling system may add the UWP application's custom-capabilities-derived SID to the access control list (ACL) of the process associated with the UWP application. At block 318, the information handling system may proceed with other start-up operations associated with the UWP application.

Similarly, at block 320, FIG. 3A illustrates server operations that may be performed by an information handling system upon initialization of a system object of the information handling system, e.g., an RPC interface. Specifically, at block 322, the information handling system, e.g., a processor of the information handling system, may load a list of trusted UWP client applications. In some embodiments, the list of trusted UWP applications may be loaded from a local disk 304. This list is an example of the custom capability controls In one embodiment, local disk 302 and local disk 304 may be the same disk, while in other embodiments they may be different disks.

At block 324, the information handling system may derive a trusted SID and/or ACL for each of one or more of the trusted UWP applications in the list of trusted UWP applications. In some embodiments, the trusted SID and/or ACL of a trusted UWP application derived at block 324 may be derived from the name of the trusted UWP application.

At block 326, the information handling system may store the derived trusted SIDs and ACLs of trusted UWP applications for subsequent use by the information handling system. In addition, the information handling system may also store universal well-known SIDs, e.g., a WORLD SID, for subsequent use by the information handling system. The derived trusted SIDs and/or ACLs and the universal well-known SIDs may be applied by the information handling system, e.g., an RPC server interface processor of the information handling system, to establish or deny connection requests made by client applications. For example, at block 328, the information handling system may start an RPC server interface that utilizes the derived trusted SIDs and/or ACLs and the universal well-known SIDs when processing connection requests made by client applications.

At block 330, FIG. 3A illustrates server operations that may be performed by an information handling system when a UWP client application requests a connection with the RPC server interface. Block 330 also includes the process for securing an information handling system from untrusted client applications, such as the process illustrated at FIG. 2, whereby a trusted UWP application is granted access to a system object, e.g., an RPC server interface. For example, at block 350, an RPC server interface of an information handling system may receive a request from a UWP client application to establish a connection between the UWP application and the information handling system system object, e.g., the RPC server interface of the information handling system. Upon receiving the request, the information handling system may, at block 332, identify a process identifier (PID) of the UWP client application that has requested a connection with the information handling system. For example, the information handling system may query the UWP application to identify the PID of the UWP application.

At block 334, the information handling system may open the process, or the handle to the process, associated with the PID. At block 336, the information handling system may query the process to access the ACL of the process. According to some embodiments, the information handling system may perform the steps at blocks 334 and 336 to obtain the ACL of the process associated with the PID of the UWP client application.

At block 338, the information handing system may determine whether to establish the requested connection between the UWP application and the RPC server interface of the information handling system based, at least in part, on analysis of the obtained ACL of the process associated with the PID of the UWP application. For example, as illustrated at block 338 of FIG. 3A, the determination may include the information handling system determining whether the ACL of the process associated with the PID of the UWP application includes a SID previously identified by the information handling system as a trusted SID. In some embodiments, the previously-identified trusted SID may be a trusted SID that was previously derived, such as at block 324, for each of one or more trusted UWP applications in a list of trusted UWP applications, e.g., the list loaded at block 322, and subsequently stored for use by the information handling system at block 338.

At block 340, the information handling system may establish the requested connection between the UWP application and the information handling system when the obtained ACL includes the previously-identified trusted SID. For example, the requested connection between the UWP application and the RPC server interface of the information handling system may be established when the obtained ACL for the UWP application includes the previously-identified trusted SID. Thus, at block 355, the information handling system indicates that the connection between the UWP application and the RPC server interface of the information handling system has been successfully established.

Figure 3B:
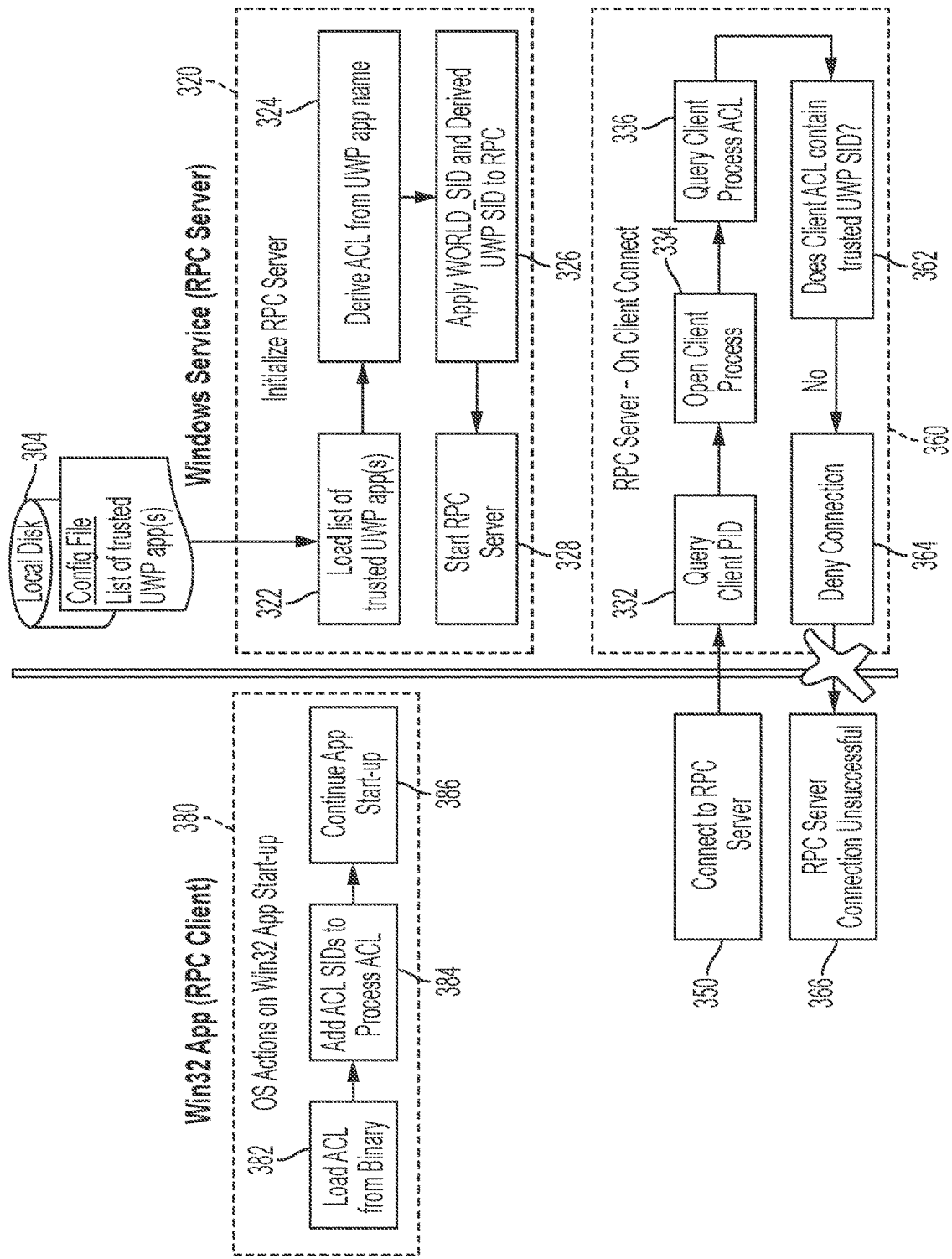
FIG. 3B is a block diagram illustrating an example process for securing an information handling system from untrusted client applications, such as the process illustrated at FIG. 2, whereby an untrusted Win32 application is denied access to a system object according to some embodiments of the disclosure.

As another example of method 200, FIG. 3B is a block diagram illustrating an example process for securing an information handling system from untrusted client applications, such as the process illustrated at FIG. 2, whereby an untrusted Win32 application is denied access to a system object. Similar to FIG. 3A, at block 320, FIG. 3B illustrates server operations that may be performed by an information handling system upon initialization of a system object of the information handling system, e.g., an RPC interface.

At block 360, FIG. 3B illustrates server operations that may be performed by an information handling system when an untrusted Win32 client application requests a connection with the RPC server interface. The operations performed at blocks 332, 334, and 336 of FIG. 3B are the same as the counterpart operations performed at blocks 332, 334, and 336 of FIG. 3A. At block 362, the information handling system may determine whether to establish the requested connection between the Win32 application and the RPC server interface of the information handling system based, at least in part, on analysis of the obtained ACL of the process associated with the PID of the Win32 application. For example, as illustrated at block 362 of FIG. 3B, the determination may include the information handling system determining whether the ACL of the process associated with the PID of the Win32 application includes a SID previously identified by the information handling system as a trusted SID. In some embodiments, the previously-identified trusted SID may be a trusted SID that was previously derived, such as at block 324, for each of one or more trusted UWP applications in a list of trusted UWP applications, e.g., the list loaded at block 322, and subsequently stored for use by the information handling system at block 362.

At block 364, the information handling system may neglect to establish the requested connection between the Win32 application and the information handling system when the obtained ACL does not include the previously-identified trusted SID. For example, the requested connection between the Win32 application and the RPC server interface of the information handling system may be denied when the obtained ACL for the Win32 application does not include the previously-identified trusted SID. Thus, at block 366, the information handling system indicates that the connection between the Win32 application and the RPC server interface of the information handling system was unsuccessful.

In some embodiments, a Win32 application does not require the same security operations as a UWP application to be performed when the application starts up. For example, at block 380, FIG. 3B illustrates client operations that may be performed by an information handling system when a Win32 client application starts up. Specifically, at block 382, the information handling system, e.g., a processor of the information handling system, may load an ACL associated with the Win32 application. At block 384, the information handling system may add the ACL SIDs to the process associated with the Win32 application. At block 318, the information handling system may proceed with other start-up operations associated with the Win32 application. The lower security measures associated with the Win32 application may lead to denial of connection requests by the information handling system, such as at block 364 of FIG. 3B.

The schematic flow chart diagram of FIG. 2 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a processor of an information handling system may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EE-PROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for securing an information handling system from untrusted client applications, comprising:
   executing, by a processor of the information handling system, a first client application of a first type; loading, by a processor of the information handling system, a custom capabilities definition of the first client application of the first type;
   determining, by the processor of the information handling system, a first security identifier (SID) for the first client application based on the custom capabilities of the first client application;
   inserting, by the processor of the information handling system, the first security identifier (SID) to an access control list associated with the first client application of a plurality of access control lists;
   executing, by the processor of the information handling system, a second client application of a second type;
   inserting, by the processor of the information handling system, a second security identifier to an access control list associated with the second client application of the plurality of access control lists;

receiving a request from a third client application of the second type to establish a connection to a resource of the information handling system;

identifying, by the processor of the information handling system, a process identifier of the third client application of the second type that has requested the connection to the resource of the information handling system;

obtaining, by the processor, an access control list from the plurality of access control lists corresponding to a process associated with the process identifier of the third client application of the second type; and determining, by the processor, whether to establish the connection between the third client application of the second type and the resource of the information handling system based, at least in part, on analysis of the access control list.

2. The method of claim 1, wherein determining comprises determining whether the access control list includes a security identifier previously identified by the information handling system as a trusted security identifier.

3. The method of claim 2, further comprising establishing a connection between the third client application of the second type and the resource of the information handling system when the access control list includes the trusted security identifier.

4. The method of claim 2, further comprising neglecting to establish a connection between the third client application of the second type and the resource of the information handling system when the access control list does not include the trusted security identifier.

5. The method of claim 1, further comprising:
loading a list of trusted client applications;
deriving a trusted security identifier and/or an access control list for each of at least one of the trusted client applications; and
storing the trusted security identifier and/or the access control list derived for each of the at least one of the trusted client applications.

6. The method of claim 5, wherein deriving comprises deriving each trusted security identifier and/or access control list from a name of one of the trusted client applications.

7. The method of claim 1, wherein the resource of the first type is a UWP RPC resource and the third client application of the second type is a Win32 application.

8. An information handling system, comprising:
a processor, wherein the processor is configured to perform the steps comprising:
executing, by a processor of the information handling system, a first client application of a first type;
loading, by a processor of the information handling system, a custom capabilities definition of the first client application of the first type;
determining, by the processor of the information handling system, a first security identifier (SID) for the first client application based on the custom capabilities of the first client application;
inserting, by the processor of the information handling system, the first security identifier (SID) to an access control list associated with the first client application of a plurality of access control lists;
executing, by the processor of the information handling system, a second client application of a second type;
inserting, by the processor of the information handling system, a second security identifier to an access control list associated with the second client application of the plurality of access control lists;

receiving a request from a third client application of the second type to establish a connection to a resource of the information handling system;

identifying a process identifier of the third client application that has requested the connection to the resource of a first type of the information handling system, wherein the third client application is the second type;

obtaining an access control list from the plurality of access control lists corresponding to a process associated with the process identifier of the third client application of the second type; and determining whether to establish the connection between the third client application of the second type and the resource of the information handling system based, at least in part, on analysis of the access control list.

9. The information handling system of claim 8, wherein the processor performing the step of determining includes the processor performing the step of determining whether the access control list includes a security identifier previously identified by the information handling system as a trusted security identifier.

10. The information handling system of claim 9, wherein the processor is further configured to perform the step of establishing the connection between the third client application of the second type and the resource of the information handling system when the access control list includes the trusted security identifier.

11. The information handling system of claim 9, wherein the processor is further configured to perform the step of neglecting to establish a connection between the third client application of the second type and the resource of the information handling system when the access control list does not include the trusted security identifier.

12. The information handling system of claim 8, wherein the processor is further configured to perform the steps comprising:
loading a list of trusted client applications;
deriving a trusted security identifier and/or an access control list for each of at least one of the trusted client applications; and
storing the trusted security identifier and/or the access control list derived for each of the at least one of the trusted client applications.

13. The information handling system of claim 12, wherein the processor performing the step of deriving includes the processor performing the step of deriving each trusted security identifier and/or access control list from a name of one of the trusted client applications.

14. A computer program product, comprising:
a non-transitory computer readable medium comprising instructions to perform steps comprising:
executing, by a processor of the information handling system, a first client application of a first type;
loading, by a processor of the information handling system, a custom capabilities definition of the first client application of the first type;
determining, by the processor of the information handling system, a first security identifier (SID) for the first client application based on the custom capabilities of the first client application;
inserting, by the processor of the information handling system, the first security identifier (SID) to an access control list associated with the first client application of a plurality of access control lists;

executing, by the processor of the information handling system, a second client application of a second type;

inserting, by the processor of the information handling system, a second security identifier to an access control list associated with the second client application of the plurality of access control lists;

receiving a request from a third client application of the second type to establish a connection to a resource of the information handling system;

identifying a process identifier of the third client application that has requested the connection to the resource of a first of the information handling system, wherein the third client application is the second type;

obtaining an access control list from the plurality of access control lists corresponding to a process associated with the process identifier of the third client application of the second type; and determining whether to establish the connection between the third client application of the second type and the resource of the information handling system based, at least in part, on analysis of the access control list.

15. The computer program product of claim 14, wherein the non-transitory computer readable medium comprises instructions to perform the step of determining whether the access control list includes a security identifier previously identified by the information handling system as a trusted security identifier.

16. The computer program product of claim 15, wherein the non-transitory computer readable medium comprises instructions to perform the step of establishing the connection between the third client application of the second type and the resource of the information handling system when the access control list includes the trusted security identifier.

17. The computer program product of claim 15, wherein the non-transitory computer readable medium comprises instructions to perform the step of neglecting to establish a connection between the third client application of the second type and the resource of the information handling system when the access control list does not include the trusted security identifier.

18. The computer program product of claim 14, wherein the non-transitory computer readable medium comprises instructions to perform steps further comprising:

loading a list of trusted client applications;

deriving a trusted security identifier and/or an access control list for each of at least one of the trusted client applications; and storing the trusted security identifier and/or the access control list derived for each of the at least one of the trusted client applications.

19. The computer program product of claim 18, wherein the non-transitory computer readable medium comprises instructions to perform the step of deriving each trusted security identifier and/or access control list from a name of one of the trusted client applications.

\* \* \* \* \*